United States Patent
Borto et al.

(10) Patent No.: US 10,544,689 B2
(45) Date of Patent: Jan. 28, 2020

(54) HYBRID BLADE FOR TURBOMACHINES

(71) Applicant: MTU Aero Engines AG, Munich (DE)

(72) Inventors: Artur Borto, Stopnica (PL); Piotr Kapusta, Stalowa Wola (PL); Dawid Luczyniec, Hrubieszów (PL)

(73) Assignee: MTU AERO ENGINES AG, Munich (DE)

(*) Notice: Subject to any disclaimer, the term of this patent is extended or adjusted under 35 U.S.C. 154(b) by 780 days.

(21) Appl. No.: 15/280,653

(22) Filed: Sep. 29, 2016

(65) Prior Publication Data

US 2017/0241272 A1 Aug. 24, 2017

(30) Foreign Application Priority Data

Oct. 6, 2015 (EP) .................... 15188448

(51) Int. Cl.
*F01D 5/28* (2006.01)
*B22F 7/08* (2006.01)
(Continued)

(52) U.S. Cl.
CPC .............. *F01D 5/282* (2013.01); *B22F 5/04* (2013.01); *B22F 7/08* (2013.01); *B28B 1/001* (2013.01); *B28B 1/52* (2013.01); *B33Y 80/00* (2014.12); *C04B 35/80* (2013.01); *C04B 35/806* (2013.01); *F01D 5/147* (2013.01); *F01D 5/284* (2013.01); *C04B 2235/32* (2013.01); *C04B 2235/3813* (2013.01); *C04B 2235/3826* (2013.01); *C04B 2235/3843* (2013.01); *C04B 2235/522* (2013.01); *C04B 2235/524* (2013.01);
(Continued)

(58) Field of Classification Search
CPC ... F01D 5/282; F01D 5/284; C04B 35/58078; C04B 35/58028; C04B 35/58014; C04B 35/5611; F05D 2300/514
See application file for complete search history.

(56) References Cited

U.S. PATENT DOCUMENTS

| 4,543,345 A | 9/1985 | Wei |
| 4,820,663 A | 4/1989 | Mehrotra et al. |
| (Continued) | | |

FOREIGN PATENT DOCUMENTS

| DE | 19903436 A1 | 8/2000 |
| EP | 2522810 A1 | 11/2012 |
| WO | 8901920 A1 | 3/1989 |

OTHER PUBLICATIONS

McLean, A. The Applications of Ceramics to the Small Gas Turbine, ASME Gas Turbine conference and Products Show, 1970. accessed from https://proceedings.asmedigitalcollection.asme.org/data/Conferences/ASMEP/84063/V01BT02A038-70-GT-105.pdf (Year: 1970).*

(Continued)

*Primary Examiner* — Richard A Edgar
*Assistant Examiner* — Topaz L Elliott
(74) *Attorney, Agent, or Firm* — Abel Schillinger, LLP

(57) ABSTRACT

A blade for a turbomachine comprising an outer shell and an inner core which is at least partially enclosed by the outer shell and has a higher porosity than the outer shell. The outer shell is formed by a ceramic body or a body made of a ceramic matrix composite material, and the inner core is formed by a fiber-reinforced ceramic or a fiber-reinforced ceramic matrix composite material.

20 Claims, 3 Drawing Sheets

(51) Int. Cl.
*B22F 5/04* (2006.01)
*B33Y 80/00* (2015.01)
*B28B 1/00* (2006.01)
*B28B 1/52* (2006.01)
*C04B 35/80* (2006.01)
*F01D 5/14* (2006.01)

(52) U.S. Cl.
CPC ...... *F05D 2230/30* (2013.01); *F05D 2230/40* (2013.01); *F05D 2300/514* (2013.01); *F05D 2300/6033* (2013.01); *F05D 2300/614* (2013.01)

(56) References Cited

U.S. PATENT DOCUMENTS

| | | | |
|---|---|---|---|
| 4,935,178 A | | 6/1990 | Esposito et al. |
| 5,634,189 A | * | 5/1997 | Rossmann ............ B22F 3/1109 |
| | | | 428/547 |
| 7,278,830 B2 | * | 10/2007 | Vetters .................... F01D 5/147 |
| | | | 416/229 R |
| 8,021,742 B2 | * | 9/2011 | Anoshkina .............. C23C 30/00 |
| | | | 416/241 B |
| 2002/0155269 A1 | | 10/2002 | Holowzcak et al. |
| 2003/0223861 A1 | | 12/2003 | Morrison et al. |
| 2005/0249602 A1 | * | 11/2005 | Freling ................... B22F 5/009 |
| | | | 416/241 B |
| 2010/0032875 A1 | | 2/2010 | Merrill et al. |
| 2011/0111211 A1 | * | 5/2011 | Golecki ................ C04B 35/803 |
| | | | 428/329 |
| 2011/0229337 A1 | | 9/2011 | Carper et al. |
| 2013/0004326 A1 | * | 1/2013 | McCaffrey .............. F01D 5/147 |
| | | | 416/241 B |
| 2013/0084189 A1 | * | 4/2013 | Diego ................... C04B 37/001 |
| | | | 416/241 B |
| 2013/0171426 A1 | | 7/2013 | de Diego et al. |
| 2014/0271153 A1 | * | 9/2014 | Uskert .................... F01D 5/187 |
| | | | 415/177 |
| 2014/0321994 A1 | * | 10/2014 | Brzek ..................... F01D 25/12 |
| | | | 415/175 |
| 2016/0160660 A1 | * | 6/2016 | Shi .......................... F01D 5/284 |
| | | | 428/158 |
| 2016/0201479 A1 | * | 7/2016 | Abbott .................... F01D 5/282 |
| | | | 416/229 A |
| 2016/0251272 A1 | * | 9/2016 | Weaver ............... C04B 41/5059 |
| | | | 428/170 |
| 2017/0159459 A1 | * | 6/2017 | Courcot ................. F01D 5/284 |

OTHER PUBLICATIONS

Can, N. and Hurman Eric, R. Titanium carbide-silicon nitride reactions at high temperature, Journal of the Southern African Institute of Mining and Metallurgy, Dec. 2015 accessed from http://www.scielo.org.za/pdf/jsaimm/v115n12/12.pdf (Year: 2015).*
Nakamura, T. et al., "Development of CMC Turbine Parts for Aero Engines", Engineering Review vol. 47 No. 1, 2014, 4 pp. 29-32.

* cited by examiner

HYBRID BLADE FOR TURBOMACHINES

CROSS-REFERENCE TO RELATED APPLICATIONS

The present application claims priority under 35 U.S.C. § 119 of European Patent Application No. 15188448.3, filed Oct. 6, 2015, the entire disclosure of which is expressly incorporated by reference herein.

BACKGROUND OF THE INVENTION

1. Field of the Invention

The present invention relates to a hybrid blade for turbomachines such as static gas turbines or aircraft engines, the blade comprising an outer shell and an inner core, which is at least partially enclosed by the outer shell. The invention furthermore relates to a production method for such a blade.

2. Discussion of Background Information

Turbomachines, such as static gas turbines or aircraft engines, comprise a multiplicity of rotor blades and guide vanes which interact with the flowing fluid, such as air and combustion gases. The guide vanes and rotor blades are in this case exposed to high temperatures, aggressive media and high pressures. In addition, erosion and impact stresses may occur because of extraneous substances and objects entering the turbomachine. The rotor blades must further more absorb high centrifugal forces due to the high speeds at which they are rotated, with the result that blades of turbomachines have to satisfy a complex requirement profile in terms of strength, high-temperature stability, oxidation and corrosion resistance, impact strength, etc. At the same time, however, the density, in particular of the rotor blades, should be low in order to keep centrifugal forces low and to keep the masses to be accelerated low, or in aircraft engines to make a lower weight of the turbomachine possible overall.

Although a multiplicity of corresponding blades made of different materials are already known, because of the complex requirement profile there is a further need for corresponding optimization in order to be able to provide blades having a suitable property profile. For example, US 2011/0 229 337 A1, the entire disclosure of which is incorporated by reference herein, discloses a ceramic hybrid blade which comprises an outer shell region and an inner core region, the outer shell region being formed from an SiC/SiC material while the inner core region is formed from an Si/SiC composite material and a monolithic ceramic material.

In view of the foregoing, it would be advantageous to have available a blade for a turbomachine, which in particular has an optimized property profile for use in aircraft engines and, preferably with a low density, good corrosion and oxidation resistance and a high strength, in particular impact and shear strength. Also, the corresponding blade should be straightforwardly producible and reliably usable.

SUMMARY OF THE INVENTION

The present invention provides a blade for a turbomachine. The blade comprises an outer shell and an inner core which is at least partially enclosed by the outer shell and has a higher porosity than the outer shell. The outer shell is formed by a ceramic body or a body of a ceramic matrix composite material and the inner core is formed by a fiber-reinforced ceramic or a fiber-reinforced ceramic matrix composite material.

In one aspect of the blade, the outer shell may be formed by a compact ceramic body and the inner core may be formed by a porous fiber-reinforced ceramic.

In another aspect of the blade, the ceramic matrix composite material may be a ceramic/ceramic composite material or a composite of a ceramic and one or more intermetallic compounds.

In yet another aspect of the blade, the porosity of the outer shell may be not higher than 5 vol %, e.g., not higher than 1 vol %, and/or the porosity of the inner core may range from 10 to 30 vol %., e.g., from 15 to 23 vol %.

In yet another aspect of the blade, (i) the ceramic material by which the ceramic body of the outer shell or the body of the ceramic matrix composite material of the outer shell is formed and/or (ii) the ceramic material by which the ceramic of the core or the ceramic matrix composite material of the core is formed and/or (iii) the fibers of the fiber-reinforced ceramic or of the fiber-reinforced matrix composite material may comprise at least one material which is selected from $HfB_2$, $ZrB_2$, HfN, ZrN, TiC, TiN, $ThO_2$, TaC and mixtures of at least one of the aforementioned materials with SiC.

The present invention also provides a method for producing a blade of a turbomachine, e.g., a blade as set forth above. The method comprises forming an outer shell of the blade from a ceramic body or from a body of ceramic matrix composite material and subsequently using the outer shell thus formed as a mold for an inner core. The inner core is formed by introducing a flowable mixture into the outer shell. The flowable mixture and the outer shell are formed into the blade by a heat treatment.

In one aspect of the method, the outer shell may be produced by a generative method, e.g. by a three-dimensional printing method, or may be produced by a wax or plastic melting method.

In another aspect of the method, a ceramic slurry, which is formed into a green body, may be used for producing the outer shell, the green body being used directly or after a heat treatment as a mold for the inner core.

In yet another aspect of the method, the flowable mixture may comprise a starting material comprising from 10 to 30 vol % of fibers, e.g., from 15 to 25 vol % of fibers and from 20 to 30 vol % of one or more pore-forming agents, the remainder being ceramic material and/or one or more intermetallic compounds. Further, the starting material may be mixed with a solvent such as hexane and/or distilled water to form the flowable mixture.

In a still further aspect of the method, the flowable mixture may be homogenized before introduction into the outer shell.

In another aspect, the ceramic material for at least one constituent from the group that comprises the ceramic slurry and the ceramic material of the flowable mixture and the fibers of the flowable mixture may be selected from at least one material selected from $HfB_2$, $ZrB_2$, HfN, ZrN, TiC, TiN, $ThO_2$, TaC and mixtures of at least one of the aforementioned materials with SiC.

In another aspect of the method, the outer shell and the flowable mixture in the outer shell may be aged at a temperature ranging from about 1300° C. to about 1700° C. for at least about 2 hours.

The present invention also provides a turbomachine which comprises one or more blades as set forth above, as well as a blade which is obtainable by the method set forth above.

In a manner similar to the hybrid blade of US 2011/0 229 337 A1, the invention proposes a hybrid blade which comprises an outer shell and an inner core, the outer shell at least partially enclosing the inner core. Here, the phrase "partially enclosing" is intended to mean that the outer shell may have openings in particular regions in order to gain external access to the inner core, which is necessary for example for production. Correspondingly, the outer shell encases the inner core preferably in the range of more than half the surface of the inner core, preferably more than 70% and in particular more than 90% of the surface of the inner core.

According to the invention, the outer shell is formed from a ceramic body or from a ceramic matrix composite material, while the inner core is formed from a fiber-reinforced ceramic or a fiber-reinforced ceramic matrix composite material. In addition, the inner core has a higher porosity than the outer shell. The strength of the inner core can be improved by the fiber reinforcement, while at the same time the elasticity and fracture toughness are increased by the higher porosity. The hybrid blade according to the invention can therefore combine the advantages of the ceramic material with an improved impact strength and fracture toughness, the density additionally being kept low by the porosity of the inner core. By virtue of the high-temperature stability of the ceramic material, the working temperature of a corresponding blade can be selected to be very high, which on the one hand can improve the efficiency of the turbomachine and on the other hand can simplify production of the blade, since cooling channels and the like can be avoided.

Preferably, the outer shell is formed from a compact ceramic body and the inner core is formed from a porous fiber-reinforced ceramic.

Instead of a homogeneous ceramic material, it is also possible to use a ceramic matrix composite material both for the outer shell and for the inner core, in which case the ceramic matrix composite material may be a ceramic/ceramic composite material or a composite of a ceramic and an intermetallic compound. In the case of a ceramic/ceramic composite material, the ceramic matrix composite material is formed from at least two different ceramics, while, in the case of a composite of a ceramic and an intermetallic compound, a combination of these materials is provided. Just like a homogeneous ceramic material which is formed from a uniform ceramic material, the ceramic matrix composite material for the core may additionally be formed with fiber reinforcement. The fibers for the fiber-reinforced ceramic or the fiber-reinforced ceramic matrix composite material may, in particular, be fibers from the same ceramic material as that with which the matrix of the ceramic matrix composite material or the ceramic base material of the fiber-reinforced ceramic is formed, in which case the fibers may be used as so-called whiskers (needle crystals) or as chopped ceramic fibers, for example with dimensions in the range of from 0.5 µm to 2 µm, preferably from 0.6 µm to 1 µm in terms of diameter and/or a length in the range of from 5 µm to 100 µm, preferably from 10 µm to 80 µm.

Hafnium diboride, zirconium diboride, hafnium nitride, zirconium nitride, titanium carbide, titanium nitride, thorium oxide, tantalum carbide and mixtures of an aforementioned substance with silicon carbide may be envisaged as ceramic material both for the outer shell and for the matrix of the ceramic matrix composite material of the shell or of the core, as well as the fibers of the fiber-reinforced ceramic or of the fiber-reinforced ceramic matrix composite material.

The outer shell may have a wall thickness in the range of from 1.5 mm to 3 mm.

The porosity of the outer shell may be less than or equal to 5 vol %, in particular less than or equal to 1 vol %, so that the outer shell has a dense and compact form.

The porosity of the inner core may range from 10 to 30 vol %, in particular from 15 to 23 vol %, so that there is a significant proportion of pores, which correspondingly influences the property profile of the blade.

According to the invention, the production of a corresponding blade is carried out by initially manufacturing the outer shell and then using it as a mold for the inner core. The outer shell may be produced by a generative method in which the shell is formed layer-by-layer from a powder material or a corresponding mixture with a solvent, for example by a 3D printing method, or by wax or plastic melting methods.

The outer shell may be used in the form of a green body which has been produced by the aforementioned method from a ceramic slurry, or after burning of the outer shell as a mold for the core.

For the production of the core, a flowable mixture which can be introduced into the cavity of the previously produced outer shell is produced from a starting material. The starting material for the production of the flowable mixture may comprise pore-forming agents for generation of the pores in the inner core of the blade, for example in the form of organic compounds such as nylon, polyester, acrylic compounds, epoxy resins and the like, which in a subsequent heat treatment may be burnt or converted into a gaseous state in order to form corresponding pores in the inner core of the blade. The starting material for the flowable mixture may comprise from 20 to 30 vol % of pore-forming agents and from 10 to 30 vol %, in particular from 15 to 25 vol %, of fibers, the remainder being ceramic material and/or intermetallic compounds.

As ceramic material, the aforementioned ceramic substances may again be envisioned both for the fibers and for the matrix material. The starting material may be used directly as a powder mixture or, in order to improve the flowability, be mixed with a solvent, in particular with an organic solvent, for example hexane, or with water, in particular distilled water.

The flowable mixture, which is introduced into the cavity of the outer shell of the blade in order to form the inner core of the blade, may be homogenized before introduction into the outer shell, for example via rotary mixers and/or by ultrasound homogenization. The effects achievable by this are, on the one hand, that the constituents are distributed homogeneously and uniformly and, on the other hand, that the fibers contained in the form of whiskers or needle crystals are oriented in different directions, so as to provide a uniform isotropic property profile in different directions.

After introduction of the flowable mixture into the cavity of the outer shell, the outer shell filled with the flowable mixture is subjected to a heat treatment so that, on the one hand, the pore-forming agents of the flowable mixture are converted into the gaseous state and/or expelled, in order to form corresponding pores in the inner core of the blade, and on the other hand the ceramic material and/or optionally contained intermetallic compounds are bonded by sintering to form a single solid blade body. In this case, both the outer shell, if it has been used as a green body as a mold for the inner core, and the inner core, may be sintered, in which case a firm bonding between the inner core and the outer shell can be achieved simultaneously.

The heat treatment may be carried out at a temperature in the range of from about 1300° C. to about 1700° C. for a time equal to or greater than about 2 hours.

BRIEF DESCRIPTION OF THE DRAWINGS

In the appended drawings, purely schematically.

DETAILED DESCRIPTION OF EMBODIMENTS OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

Exemplary Embodiment

Figure 1:
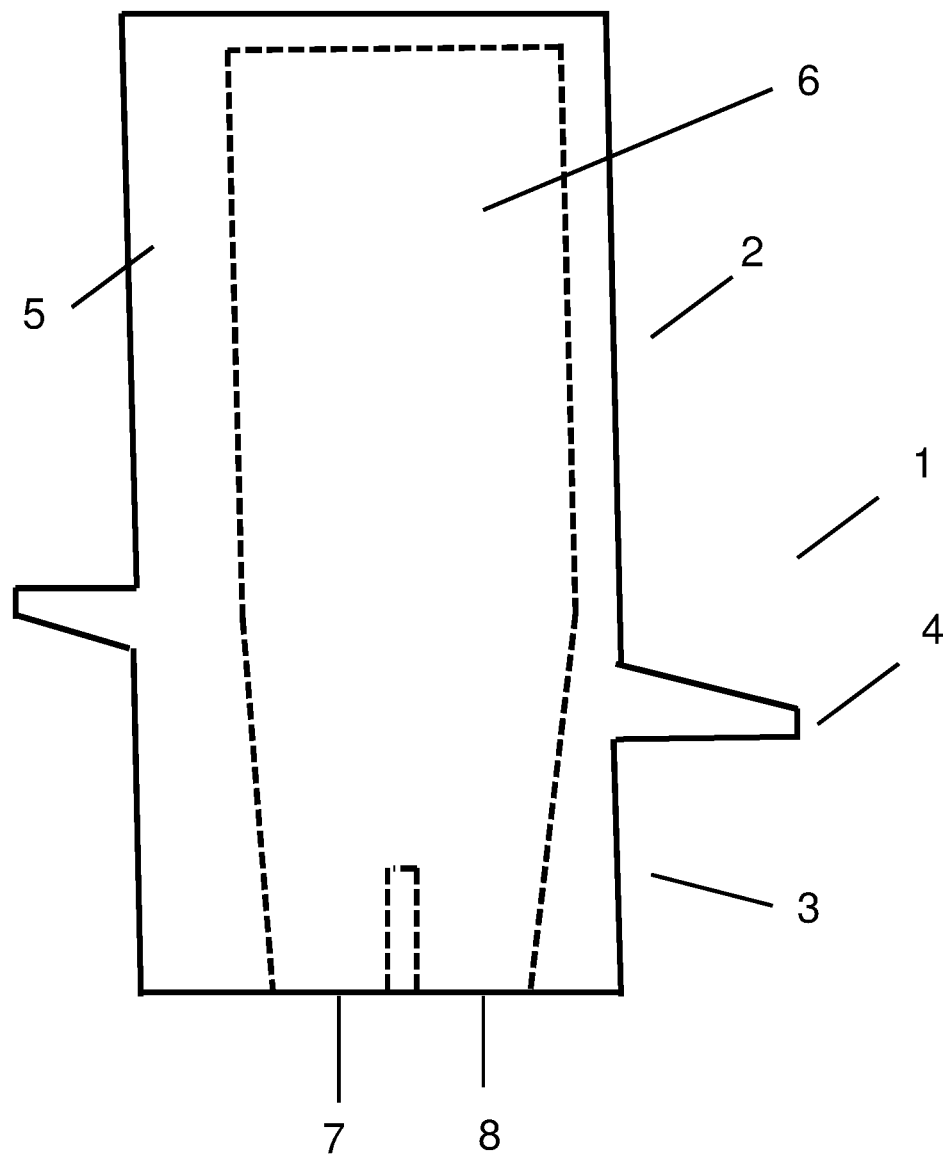
FIG. 1 shows a side view of a turbine blade according to the invention with a core indicated by dashes.

FIG. 1 shows a side view of a high-pressure turbine blade 1 according to the present invention. The high-pressure turbine blade 1 comprises a blade span (airfoil) region 2 and a root region 3, with which the turbine blade 1 can be fitted into a turbine disk. Provided between the blade span region 2 and the root region 3, there is an inner cover strip (shroud) 4.

Figure 2:
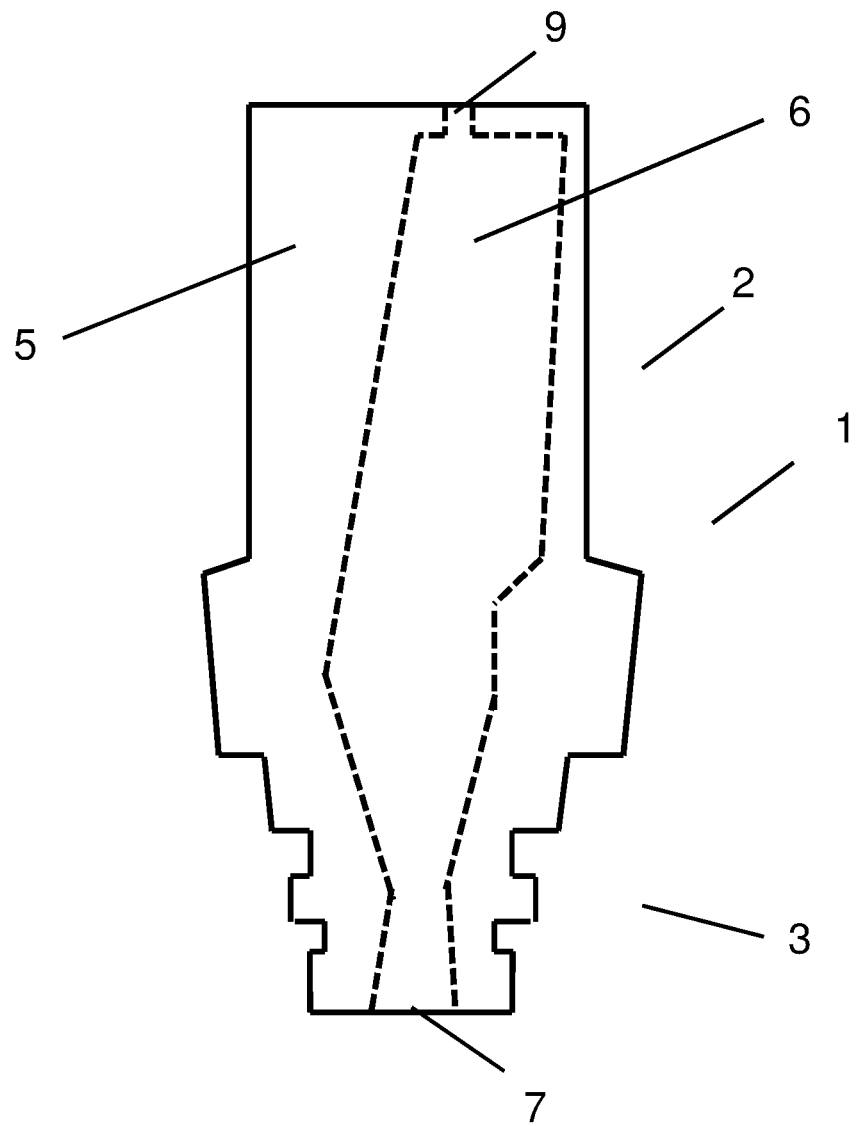
FIG. 2 shows a side view of the turbine blade of FIG. 1 with a core, indicated by dashes, rotated by 90°.
Figure 3:
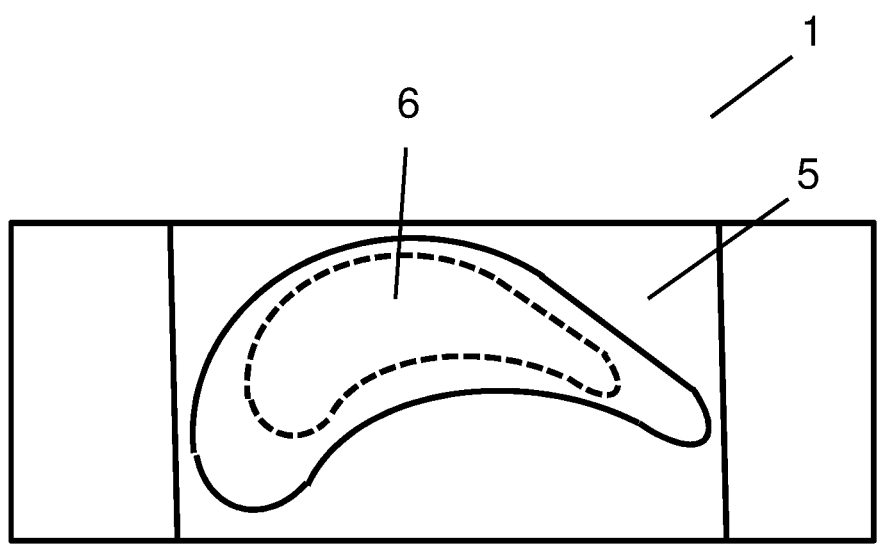
FIG. 3 shows a cross-sectional view of the turbine blade of FIG. 1 with a core indicated by dashes.

According to the invention, the high-pressure turbine blade 1 shown in FIG. 1 to FIG. 3 comprises an outer shell 5 and an inner core 6. The outer shell 5 may be formed from a dense, compact ceramic, for example hafnium diboride, zirconium diboride, hafnium nitride, zirconium nitride, titanium carbide, titanium nitride, thorium dioxide, tantalum carbide and/or combinations of one or more of the aforementioned ceramics with admixtures of silicon carbide.

The inner core 6, which is enclosed by the outer shell 5 except for the casting openings 7 and 8 and the vent opening 9 (see FIG. 3), is formed in the exemplary embodiment shown by a porous fiber-reinforced ceramic body, in which case both the fibers and the ceramic matrix in which the fibers are incorporated may be formed from the same ceramic material as the outer shell 5. In particular, the fiber and matrix materials may also be the same. The fibers, which are incorporated in the ceramic matrix of the inner core 6, may be in the form of chopped ceramic fibers or so-called whiskers (needle crystals). The porosity of the inner core 6 may, for example, be 20 vol %.

The production of the blade 1 is carried out by first manufacturing the outer shell 5, in which case a 3D printing method, in which the shell 5 can be printed layer-by-layer with a ceramic slurry in order to form a green body, may be used as the manufacturing method. Furthermore, other methods may also be used as an alternative, for example wax melting or plastic melting methods in which a wax or plastic model of the inner core 6 is coated with a ceramic slurry, for example by repeated immersion, so that an outer shell is formed around the wax or plastic core. The outer core may then additionally be shaped according to the outer contour of the blade be produced, and the wax or plastic model may be melted after burning, or simultaneously with the burning of the ceramic slurry or of the green body resulting therefrom, so that a cavity is produced in the shape of the outer shell 5.

The corresponding ceramic body in the shape of the outer shell 5, or a green body after production by 3D printing, is then used as a mold for the inner core 6. To this end, a flowable mixture, which forms the inner core 6, is poured into the outer shell 5 through the casting openings 7 and 8, in which case air in the cavity can escape from the outer shell 5 through the vent opening 9.

The flowable mixture comprises a starting material with which the desired inner core 6 of the blade 1 can be produced. In the present exemplary embodiment, the starting material comprises about 20 vol % of chopped ceramic fibers and about 25 vol % of pore-forming agents for producing the pores, as well as corresponding ceramic material in the form of ceramic powder as the remainder. The pore-forming agents may be formed by organic substances, for example nylon, polyester, acrylic compounds or epoxy resins.

The flowable mixture may furthermore be formed with or without liquid components. Preferably, the flowable mixture comprises a solvent, for example an organic solvent such as hexane, or water, in particular distilled water.

Before introduction of the flowable mixture into the cavity of the outer shell, the flowable mixture may be mixed in a mixer, for example in a rotary mixer with a rotational speed of from about 15,000 to 20,000 revolutions per minute for a time of a few minutes, for example about 2 minutes. After the mixing, the flowable mixture may be put into an ultrasound homogenizer in order to obtain a mixture which is as homogeneous as possible. This mixture may then be introduced into the outer shell 5, or the cavity of the outer shell 5.

By a heat treatment of the outer shell 5 filled with the flowable mixture at a temperature of from about 1300° C. to about 1700° C. for a time of about 2 or more hours, the pore-forming agents are converted into the gas phase in order to form the desired pores in the inner core 6. At the same time, the ceramic material is sintered to form a ceramic body, the inner core 6 and the outer shell 5 simultaneously being bonded to one another.

A blade 1 is thus formed which has a porous inner core 6 with a compact, dense outer shell 5, and in which the inner core 6 additionally comprises ceramic fibers. Because of its structure, such a blade 1 has an improved fracture toughness, a low density simultaneously being achieved. The tensile strength of the blade is improved by the incorporation of chopped ceramic fibers or needle crystals into the inner core, while the shear strength and the elasticity are improved by the porosity of the inner core.

Although the present invention has been described in detail with the aid of the exemplary embodiment, it is clear to a person skilled in the art that the invention is not restricted by this exemplary embodiment, but rather that variants are possible in that individual features may be omitted or other types of combinations of features may be implemented, without departing from the protective scope of the appended claims. The present disclosure also includes all combinations of the individual features proposed.

LIST OF REFERENCE NUMBERS 1 blade, high-pressure turbine blade
2 blade span region
3 root region
4 cover strip
5 outer shell
6 inner core
7 casting opening 8 casting opening
9 vent opening

What is claimed is:

1. A blade for a turbomachine, wherein the blade comprises an outer shell and an inner core which is at least partially enclosed by the outer shell and has a higher porosity than the outer shell, the outer shell being formed by a body of ceramic material (A) or a body of a ceramic matrix composite material (B), and the inner core being formed by a fiber-reinforced ceramic material (C) or a fiber-reinforced ceramic matrix composite material (D), and wherein
 (i) the ceramic material (A) or the ceramic matrix composite material (B) comprises at least one material which is selected from $HfB_2$, $ZrB_2$, HfN, TiC, TiN, $ThO_2$, TaC and mixtures of at least one of the aforementioned materials with SiC or comprises ZrN in combination with one or more of $HfB_2$, $ZrB_2$, HfN, TiC, TiN, $ThO_2$, TaC, and SiC; and/or
 (ii) the ceramic material (C) or the ceramic matrix composite material (D) which is reinforced with fibers comprises at least one material which is selected from $HfB_2$, $ZrB_2$, HfN, ZrN, TiC, TiN, $ThO_2$, TaC and mixtures of at least one of the aforementioned materials with SiC; and/or
 (iii) the fibers which reinforce the ceramic material (C) or the matrix composite material (D) comprise at least one material which is selected from $HfB_2$, $ZrB_2$, HfN, ZrN, TiN, $ThO_2$, TaC and mixtures of at least one of the aforementioned materials with SiC or comprise TiC in combination with one or more of $HfB_2$, $ZrB_2$, HfN, ZrN, TiN, $ThO_2$, and TaC.

2. The blade of claim 1, wherein the outer shell is formed by a compact ceramic body and the inner core is formed by a porous fiber-reinforced ceramic.

3. The blade of claim 1, wherein the ceramic matrix composite material (B) is a ceramic/ceramic composite material or a composite of a ceramic and one or more intermetallic compounds.

4. The blade of claim 1, wherein the ceramic matrix composite material (D) is a ceramic/ceramic composite material or a composite of a ceramic and one or more intermetallic compounds.

5. The blade of claim 1, wherein the porosity of the outer shell is not higher than 5 vol %, and/or the porosity of the inner core is between 10 and 30 vol %.

6. The blade of claim 1, wherein the porosity of the outer shell is not higher than 1 vol %.

7. The blade of claim 1, wherein the porosity of the inner core is between 15 and 23 vol %.

8. The blade of claim 1, wherein the ceramic material (A) or the ceramic matrix composite material (B) comprises at least one material which is selected from $HfB_2$, $ZrB_2$, HfN, TiC, TiN, $ThO_2$, TaC and mixtures of at least one of the aforementioned materials with SiC or comprises ZrN in combination with one or more of $HfB_2$, $ZrB_2$, HfN, TiC, TiN, $ThO_2$, TaC, and SiC.

9. The blade of claim 1, wherein the ceramic material (C) or the ceramic matrix composite material (D) which is reinforced with fibers comprises at least one material which is selected from $HfB_2$, $ZrB_2$, HfN, ZrN, TiC, TiN, $ThO_2$, TaC and mixtures of at least one of the aforementioned materials with SiC.

10. The blade of claim 1, wherein the fibers which reinforce the ceramic material (C) or the matrix composite material (D) comprise at least one material which is selected from $HfB_2$, $ZrB_2$, HfN, ZrN, TiN, $ThO_2$, TaC and mixtures of at least one of the aforementioned materials with SiC or comprise TiC in combination with one or more of $HfB_2$, $ZrB_2$, HfN, ZrN, TiN, $ThO_2$, and TaC.

11. A blade for a turbomachine, wherein the blade comprises an outer shell and an inner core which is at least partially enclosed by the outer shell and has a higher porosity than the outer shell, the outer shell being formed by a body of ceramic material (A) or a body of a ceramic matrix composite material (B), and the inner core being formed by a fiber-reinforced ceramic material (C) or a fiber-reinforced ceramic matrix composite material (D), and wherein the inner core has been produced by introducing a flowable mixture comprising reinforcing fibers and one or more pore-forming agents into a cavity of the outer shell and subsequent heat treatment to burn the one or more pore-forming agents and/or convert the one or more pore-forming agents to a gaseous state to form pores in the inner core of the blade.

12. The blade of claim 11, wherein the one or more pore-forming agents comprise one or more of nylon, polyester, acrylic compounds, and epoxy resins.

13. The blade of claim 11, wherein the flowable mixture comprises from 20 to 30 vol % of the one or more pore-forming agents and from 10 to 30 vol % of the fibers, remainder ceramic material and/or intermetallic compounds.

14. The blade of claim 13, wherein the flowable mixture comprises from 15 to 25 vol % of the fibers.

15. The blade of claim 11, wherein the outer shell has been produced by a generative method or a three-dimensional printing method.

16. The blade of claim 11, wherein a ceramic slurry formed into a green body has been used for producing the outer shell.

17. The blade of claim 11, wherein the porosity of the outer shell is not higher than 5 vol %, and/or the porosity of the inner core is between 10 and 30 vol %.

18. The blade of claim 11, wherein the porosity of the outer shell is not higher than 1 vol %.

19. The blade of claim 11, wherein the porosity of the inner core is between 15 and 23 vol %.

20. The blade of claim 11, wherein
 (i) the ceramic material (A) or the ceramic matrix composite material (B) comprises at least one material which is selected from $HfB_2$, $ZrB_2$, HfN, ZrN, TiC, TiN, $ThO_2$, TaC and mixtures of at least one of the aforementioned materials with SiC; and/or
 (ii) the ceramic material (C) or the ceramic matrix composite material (D) which is reinforced with fibers comprises at least one material which is selected from $HfB_2$, $ZrB_2$, HfN, ZrN, TiC, TiN, $ThO_2$, TaC and mixtures of at least one of the aforementioned materials with SiC; and/or
 (iii) the fibers which reinforce the ceramic material (C) or the matrix composite material (D) comprise at least one material which is selected from $HfB_2$, $ZrB_2$, HfN, ZrN, TiC, TiN, $ThO_2$, TaC and mixtures of at least one of the aforementioned materials with SiC.

* * * * *